(12) United States Patent
Lee

(10) Patent No.: US 6,879,106 B2
(45) Date of Patent: Apr. 12, 2005

(54) DIELECTRIC COMPOSITION AND FABRICATION METHOD OF DIELECTRIC LAYER IN PLASMA DISPLAY PANEL

(75) Inventor: Sung Wook Lee, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 138 days.

(21) Appl. No.: 10/217,846

(22) Filed: Aug. 13, 2002

(65) Prior Publication Data

US 2003/0155863 A1 Aug. 21, 2003

(30) Foreign Application Priority Data

Feb. 20, 2002 (KR) .......................................... 2002-9109

(51) Int. Cl.[7] .................................................. H01J 17/49
(52) U.S. Cl. ...................... 313/586; 313/587; 313/582; 501/49; 501/50; 501/152
(58) Field of Search ............................... 313/582, 586, 313/587; 445/24, 25; 501/49, 50, 126, 152, 20, 22

(56) References Cited

U.S. PATENT DOCUMENTS

| | | | | |
|---|---|---|---|---|
| 3,867,303 A | * | 2/1975 | Shaw et al. | 501/50 |
| 5,749,932 A | * | 5/1998 | Lamar et al. | 501/126 |
| 6,046,121 A | * | 4/2000 | Masuko et al. | 445/24 |
| 6,339,118 B1 | * | 1/2002 | Yamashita et al. | 524/308 |
| 6,650,052 B1 | * | 11/2003 | Sohn et al. | 313/586 |

* cited by examiner

Primary Examiner—Mariceli Santiago
(74) Attorney, Agent, or Firm—Hong, Degerman, Kang & Schmadeka

(57) ABSTRACT

A dielectric composition and a fabrication method for a dielectric layer in a plasma display panel, by which contrast of the plasma display panel can be improved through simple fabrication processes. The dielectric composition for the dielectric layer in the plasma display panel comprises: a glass of $P_2O_5$—$B_2O_3$—$ZnO$ group; and a filler consisting of $Nd_2O_3$.

12 Claims, 5 Drawing Sheets

DIELECTRIC COMPOSITION AND FABRICATION METHOD OF DIELECTRIC LAYER IN PLASMA DISPLAY PANEL

BACKGROUND OF THE INVENTION

1. Field of the Invention

The present invention relates to a plasma display panel, and particularly, to a dielectric composition and a fabrication method of a dielectric layer in a plasma display panel.

2. Description of the Background Art

Generally, a plasma display panel is a display device for exciting a fluorescent layer using ultraviolet rays of plasma and for displaying image using visible light generated from the fluorescent layer.

On the other hand, in a conventional plasma display panel, contrast is reduced by near infrared ray or visible light generated from discharge gas and by outer visible light irradiated from outer side and reflected. Therefore, in order to improve the contrast, a color filter is applied to the plasma display panel.

In case that the color filter is applied to the plasma display panel, fabrication processes of the PDP become complex, and yield is reduced and fabrication cost is increased. Hereinafter, a structure of the conventional plasma display panel will be described with reference to FIG. 1.

FIG. 1 is a cross-sectional view showing a structure of the plasma display panel applied by the color filter.

As shown therein, the conventional plasma display panel comprises: a lower insulation layer 9 formed on a lower glass substrate 10; an address electrode 11 formed on a predetermined portion on the lower insulation layer 9; a lower dielectric layer 8 formed on an entire upper surface of the address electrode 11 and the lower insulation layer 9; a barrier rib 7 defined on a predetermined portion on the lower dielectric layer 8 in order to divide respective discharging cell; a black matrix layer 12 formed on the barrier rib 7; a fluorescent layer 13 formed as a predetermined thickness on side surface of the black matrix layer 12 and the barrier rib 7 and on entire upper surface of the lower dielectric layer 8 for discharging Red, Green, and Blue visible light by being supplied the ultraviolet ray; an upper glass substrate 2; a sustain electrode 3 formed on a predetermined part of the upper glass substrate 2 so as to be crossed with the address electrode 11 at right angle; a bus electrode 5 formed on a predetermined part of the sustain electrode 3; an upper dielectric layer 4 formed on entire upper surface of the bus electrode 5, of the sustain electrode 3, and of the upper glass substrate 2; a passivation layer 6 formed on the upper dielectric layer 4 for protecting the upper dielectric layer 4; and a color filter 1 for filtering colors represented by respective pixels, and for transmitting the filtered color by being applied to the upper glass substrate 2. Hereinafter, operations of the conventional plasma display panel will be described.

In the above plasma display panel, discharge gas in a pixel area defined by the barrier rib 7 becomes plasma status by potential difference of the address electrode 11 and the bus electrode 5, and the fluorescent layer 13 is excited by the ultraviolet ray of the plasma to generate visible light. In addition, the image is displayed using the visible light. That is, the plasma display panel displays desired color by exciting the fluorescent layer 13 using the ultraviolet ray generated by Xe gas among the discharge gases including He gas, Xe gas, Ne gas, etc. injected into the discharge area divided by the barrier rib 7.

Also, the Ne gas included in the discharge gas is injected into the discharge area in order to prevent thermal deformation of the dielectric layer or of the fluorescent layer caused by crashes of accelerated gas ions.

However, the Ne gas discharges the visible light of orange color by discharging, and therefore, colorimetric purity and contrast of the plasma display panel are reduced. Therefore, the color filter 1 is mounted on the plasma display panel in order to block the visible light of orange color generated by the discharge of Ne gas.

Herein, the color filter 1 filters only the colors represented by the respective pixels, and comprises color layers 1A~1C transmitting the filtered color and blocking layer 1D formed between the color layers for blocking light.

When the color filter 1 is applied to the plasma display panel, reflectivity of visible lights irradiated from outer side of the plasma display panel can be improved, and accordingly, the contrast of the plasma display panel can be improved. However, in case of using the color filter 1, although the contrast can be improved, the fabrication processes of the plasma display panel become complex, and therefore, the yield is reduced and fabrication cost is increased.

On the other hand, the color filter 1 can be replaced with a black strip layer (not shown), however, the black strip layer has lower aperture plane and luminous efficiency is lowered.

Other conventional plasma display panel and fabrication method thereof is disclosed in U.S. Pat. No. 5,838,106 registered on Nov. 17, 1998, in U.S. Pat. No. 6,242,859 registered on Jun. 5, 2001, and in U.S. Pat. No. 6,344,080 registered on Feb. 5, 2002.

As described above, although the plasma display panel according to the conventional art can improve its contrast in case of using the color filter 1, the fabrication processes become complex, and thereby the yield is lowered, and the fabrication cost is increased.

Also, in case that the block strip layer instead of the color filter 1 is applied to the plasma display panel according to the conventional art, the aperture plane is narrow, and thereby the luminous efficiency is lowered.

SUMMARY OF THE INVENTION

Therefore, an object of the present invention is to provide a dielectric composition and fabrication method of a dielectric layer in a plasma display panel which is able to improve contrast of the plasma display panel through simple fabricating processes.

To achieve the object of the present invention, as embodied and broadly described herein, there is provided a dielectric composition of a dielectric layer in a plasma display panel comprising a glass of $P_2O_5$—$B_2O_3$—$ZnO$ group, and a filler consisting of $Nd_2O_3$.

To achieve the object of the present invention, there is provided a dielectric composition of a dielectric layer in a plasma display panel, which comprises an upper glass substrate, a sustain electrode on the upper glass substrate, a bus electrode on the sustain electrode, a lower glass substrate, a lower dielectric layer and an address electrode on the lower glass substrate, a fluorescent layer on the lower dielectric layer and on the address electrode, and a barrier rib on the lower dielectric layer, comprising a glass of $P_2O_5$—$B_2O_3$—$ZnO$ group, and a filler consisting of $Nd_2O_3$.

In order to achieve the object of the present invention, there is provided a method of fabricating dielectric layer in the plasma display panel comprising the steps of: fabricating glass by mixing $Nd_2O_3$ in the glass of $P_2O_5$—$B_2O_3$—ZnO group as a predetermined weight %; making the fabricated glass into powder by grinding, and forming a dielectric paste by mixing the powder with a binder and a solvent; applying the dielectric paste onto a glass substrate; and forming a dielectric layer by baking the applied dielectric paste.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A preferred embodiment of a dielectric composition and a fabrication method of a dielectric layer in a plasma display panel, which is able to improve contrast of the plasma display panel without forming a color filter by applying a dielectric layer formed by mixing a glass of $P_2O_5$—$B_2O_3$—ZnO group and a filler consisting of $Nd_2O_3$ to the plasma display panel to lower an optical transmittance for orange color selectively, will be described with reference to accompanying FIGS. 2~6 in more detail.

Figure 1:
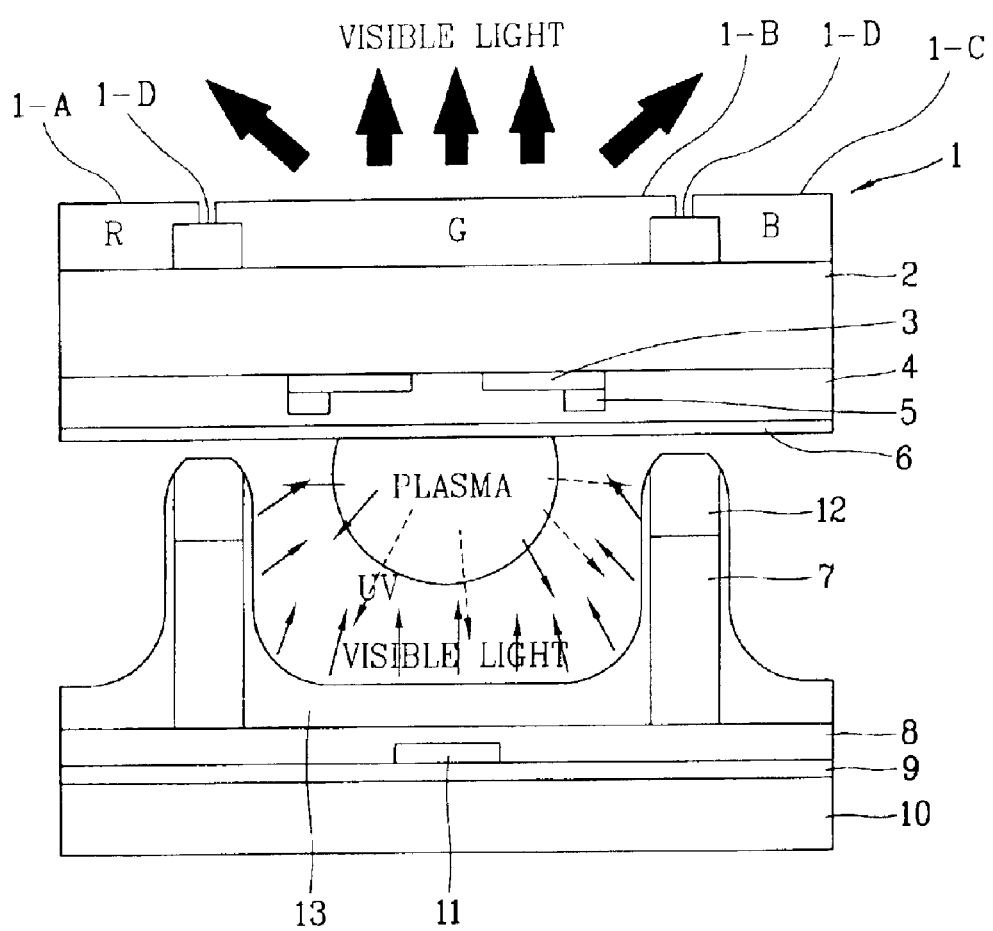
FIG. 1 is a cross-sectional view showing a structure of a plasma display panel to which a color filter is applied according to the conventional art.
Figure 2:
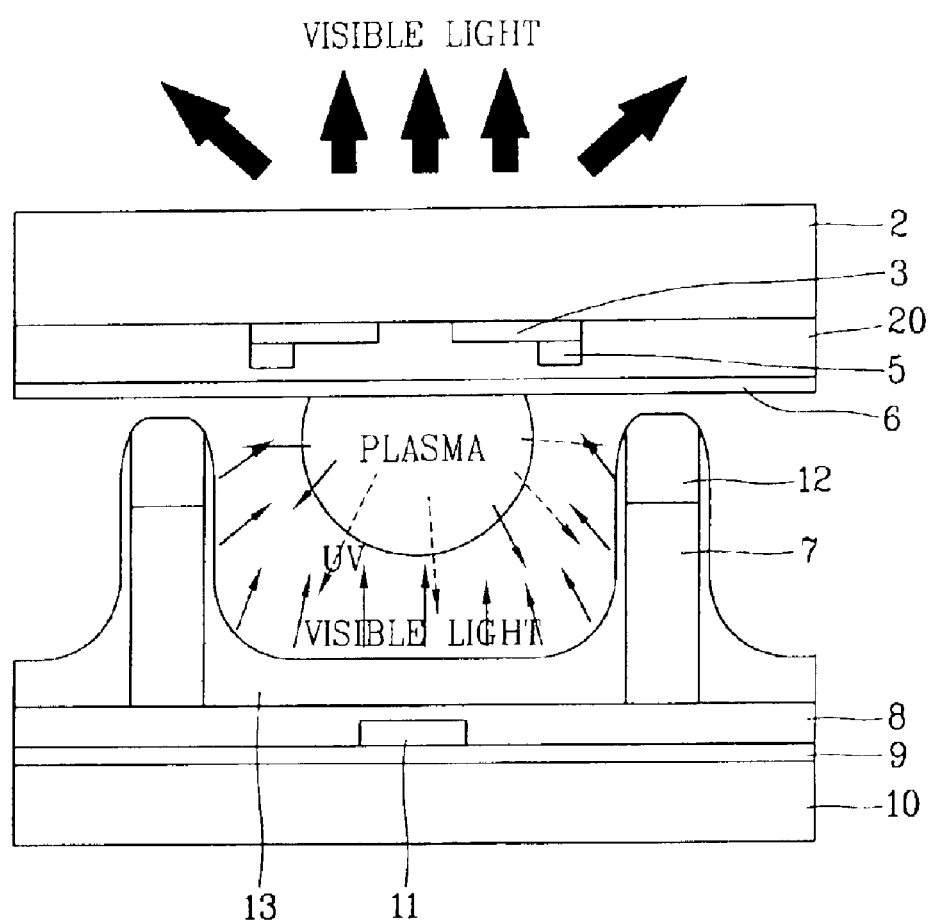
FIG. 2 is a cross-sectional view showing a structure of a plasma display panel on which an upper dielectric layer is formed according to the present invention.

FIG. 2 is a cross-sectional view showing a structure of the plasma display panel on which an upper dielectric layer is formed according to the present invention.

As shown therein, the plasma display panel comprises: a lower dielectric layer 9 formed on a lower glass substrate 10; an address electrode 11 formed on a predetermined part of the lower dielectric layer 9; a lower dielectric layer 8 formed on entire upper surface of the address electrode 11 and of the lower dielectric layer 9; a barrier rib 7 defined on a predetermined portion on the lower dielectric layer 8 in order to divide respective discharging cell; a black matrix layer 12 formed on the barrier rib 7; a fluorescent layer 13 formed as a predetermined thickness on side surface of the black matrix layer 12 and the barrier rib 7 and on entire upper surface of the lower dielectric layer 8 for discharging Red, Green, and Blue visible lights by being supplied the ultraviolet ray; an upper glass substrate 2; a sustain electrode 3 formed on a predetermined part of the upper glass substrate 2 so as to be crossed with the address electrode 11 at right angle; a bus electrode 5 formed on a predetermined part of the sustain electrode 3; an upper dielectric layer 20 formed on entire upper surface of the bus electrode 5, of the sustain electrode 3, and of the upper glass substrate 2 for filtering colors represented by respective pixels, and for transmitting the filtered color; and a passivation layer 6 formed on the upper dielectric layer 4 for protecting the upper dielectric layer 4. Hereinafter, the upper dielectric layer of the plasma display panel and a fabricating method thereof according to the present invention will be described in more detail.

The upper dielectric layer 20 is formed by mixing a filler of oxide powder consisting of $Nd_2O_3$ with the glass of $P_2O_5$—$B_2O_3$—ZnO group. The $Nd_2O3$ has a characteristic that permeates wavelengths of red, green, and blue visible lights and absorbs wavelength of orange color visible light. The above characteristic will be described as follows with reference to FIG. 3.

Figure 3:
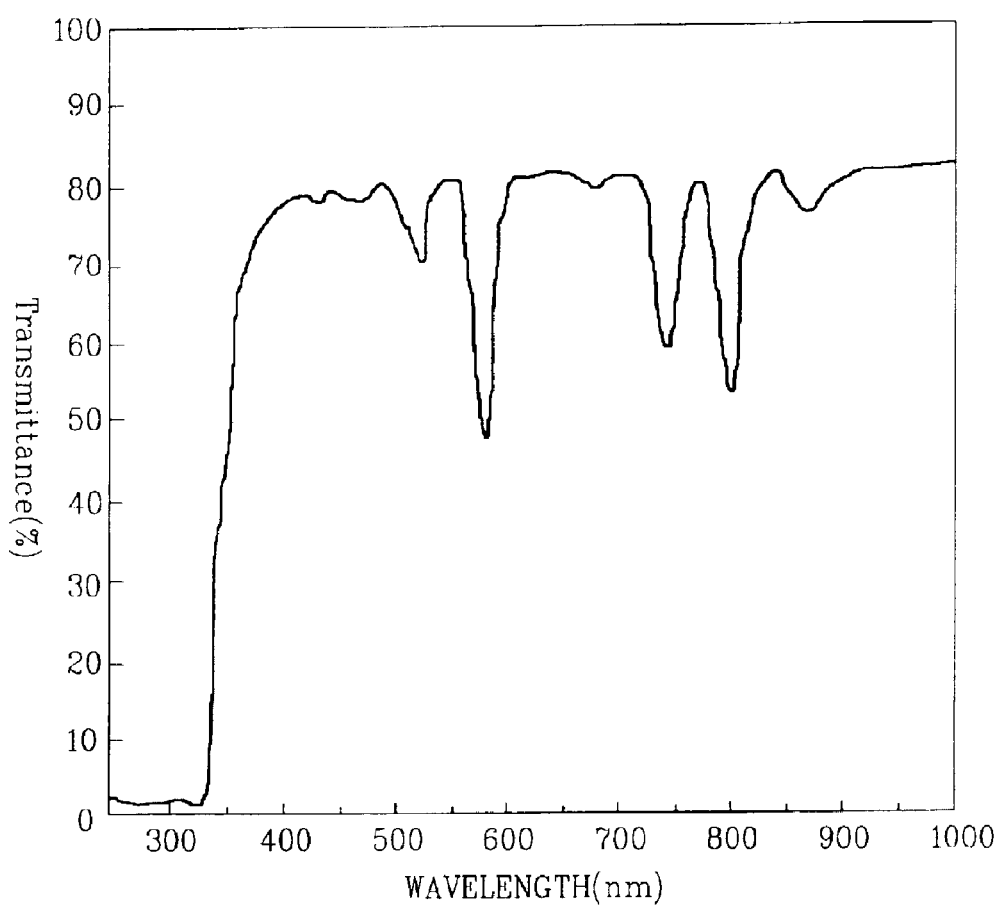
FIG. 3 is a graph showing an optical transmittance of the upper dielectric layer according to the present invention.

FIG. 3 is a graph showing optical transmittance of the upper dielectric layer according to the present invention.

As shown therein, the $Nd_2O_3$ mixed in the upper dielectric layer permeates the wavelength of red visible light (611 nm), the wavelength of green color visible light (525 nm), and the wavelength of blue color visible light (454 nm), and absorbs the wavelength of orange color visible light (585 nm). That is, the optical transmittance has the lowest value at the wavelength of orange color visible light (585 nm). Therefore, the visible light of orange color discharged by the Ne gas as described in background art can be blocked at the upper dielectric layer 20.

The upper dielectric layer 20 is formed by mixing $Nd_2O_3$ of 5~40 weight % in the glass of $P_2O_5$—$B_2O_3$—ZnO group. Herein, the glass of $P_2O_5$—$B_2O_3$—ZnO group is formed by mixing $P_2O_5$ of 28~40 weight %, $B_2O_3$ of 0~30 weight %, and ZnO of 42~60 weight % as shown in Table 1. Composition rate of Table 1 is given assuming the weight of the glass of $P_2O_5$—$B_2O_3$—ZnO group to be 100 weight percent.

TABLE 1

| Composition of the glass of $P_2O_5$—$B_2O_3$—ZnO group | | | |
| --- | --- | --- | --- |
| Component | $P_2O_5$ | ZnO | $B_2O_3$ |
| Weight % | 28~40 | 42~60 | 0~30 |

Herein, the upper dielectric layer is formed to be 20~40 μm thickness considering of higher inner voltage and optical transmittance.

Figure 4:
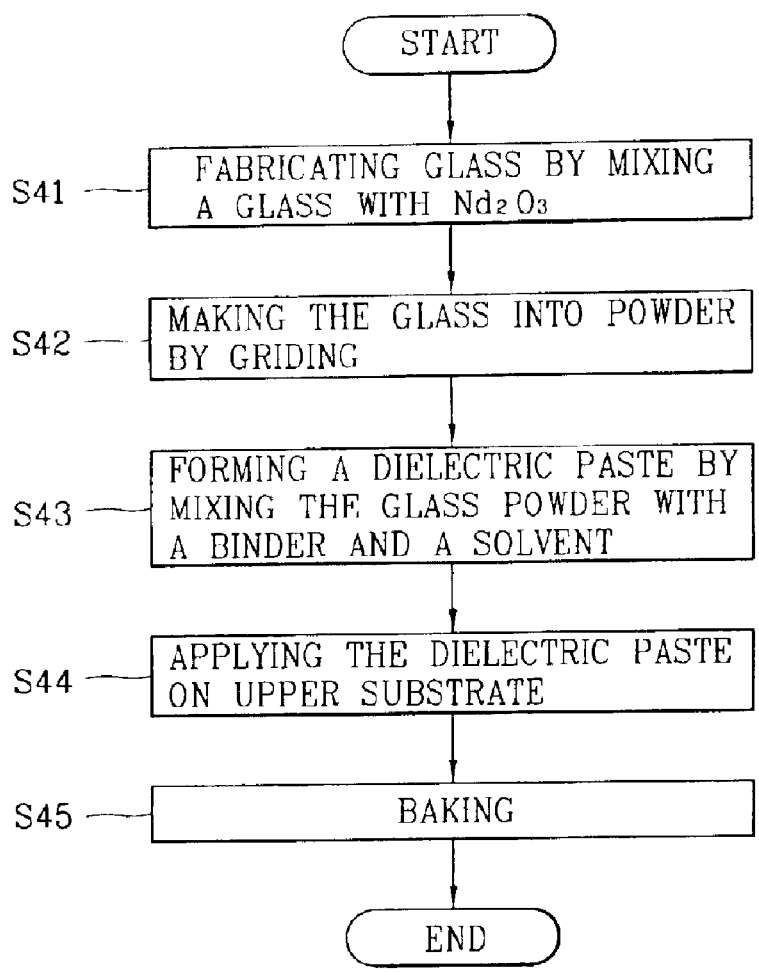
FIG. 4 is a flow chart showing a method for fabricating the upper dielectric layer according to the present invention.

FIG. 4 is a flow chart showing a method for fabricating the upper dielectric layer according to the present invention.

As shown therein, the method for fabricating the upper dielectric layer comprises the steps of: fabricating a glass by mixing the glass formed by mixing $P_2O_5$ of 28~40 weight %, $B_2O_3$ of 0~30 weight %, and ZnO of 42~60 weight % with a filler of oxide powder consisting of $Nd_2O_3$ to be 5~40 weight % (S41); making the fabricated glass into powder by grinding (S42); forming a dielectric paste by mixing the powder with a binder, and with a solvent (S43); applying the paste on entire upper surface of the upper glass substrate 2 on which the sustain electrode 21 and the bus electrode 22 are formed (S44); and baking the applied paste (S45). Hereinafter, the method for fabricating the upper dielectric layer in the plasma display panel according to the present invention will be described in more detail in order.

1. A glass is prepared in order to fabricate the upper dielectric layer. The glass is fabricated by mixing $P_2O_5$ of 28~40 weight %, $B_2O_3$ of 0~30 weight %, and ZnO of 42~60 weight %.

2. A glass is fabricated by mixing $Nd_2O_3$ of 5~40 weight % in the glass of $P_2O_5$—$B_2O_3$—ZnO group (S41).

3. The glass fabricated above is made to be powder by grinding the glass using a grinder. At that time, the glass is ground to powder having 1~5 μm particle size (S42).

4. The ground glass is mixed with a binder such as ethyl cellulose and with a solvent. Herein, an organic vehicle such as (α-terpineol or butyl-carbitol-acetate (BCA) is used as the solvent, and a dielectric paste is formed by mixing the binder, the solvent, and the glass powder (S43).

5. The paste is applied on the upper glass substrate 2 using a screen printing method or a thick film coating method (S44).

6. The applied paste is baked at temperature of 550~600° C. for 10~30 minutes to form the upper dielectric layer 20 of 20~40 μm thickness (S45).

On the other hand, PbO which pollutes the environment is included in the upper dielectric layer 23 according to the conventional art, however, $P_2O_5$ which does not harm to environment and to human beings is included in the upper dielectric layer instead of the PbO according to the present invention. Also, the filler of oxide powder consisting of $Nd_2O_3$, which has higher transmittance for red, green, and blue colors and is able to block the visible light of orange color, is added in the glass of $P_2O_5$—$B_2O_3$—ZnO group, thereby, the function of color filter can be performed only by the upper dielectric layer 20 without forming the color filter as in the conventional art. That is, according to the present invention, the color filter is not formed, and the upper dielectric layer 20 is on entire upper surfaces of the bus electrode 5, the sustain electrode 3, and the upper glass substrate 2, and thereby, the colors represented by respective pixels can be transmitted after filtering.

Figure 5:
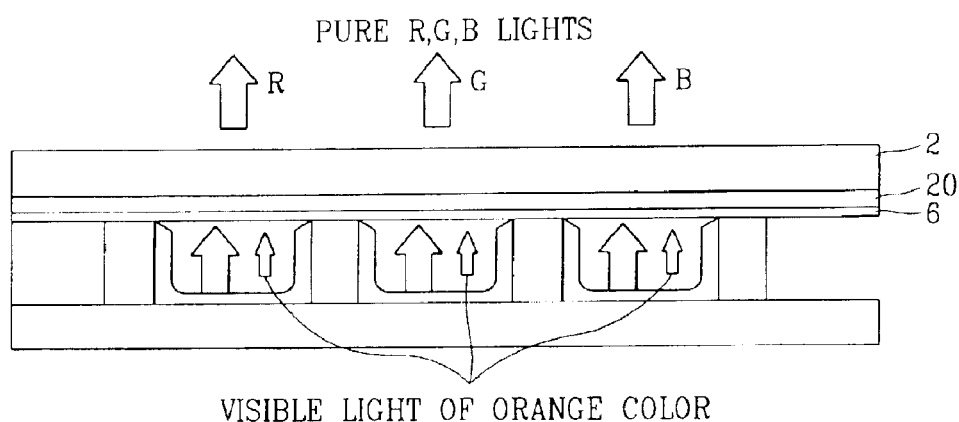
FIG. 5 is a pattern diagram showing a panel filtering visible light of orange color generated in a plasma display panel to which the upper dielectric layer is applied according to the present invention.

FIG. 5 is a pattern diagram showing a panel for filtering the visible light of orange color generated in the plasma display panel to which the upper dielectric layer according to the present invention is applied.

As shown therein, the colorimetric purity can be improved through the upper dielectric layer 20 formed by mixing the filler ($Nd_2O_3$) having a predetermined transmittance for red, green, and blue colors and blocking the visible light of orange color in the glass of $P_2O_5$—$B_2O_3$—ZnO group. At that time, the wavelength of the orange color visible light is 585 nm, and therefore, the transmittance for the green color visible light having the wavelength of 525 nm similar to that of the orange color may be lowered. However, the transmittance for the green color visible light can be improved by adding $Pr_2O_3$ to be less than 5 weight % in the process of fabricating the dielectric paste.

Figure 6:
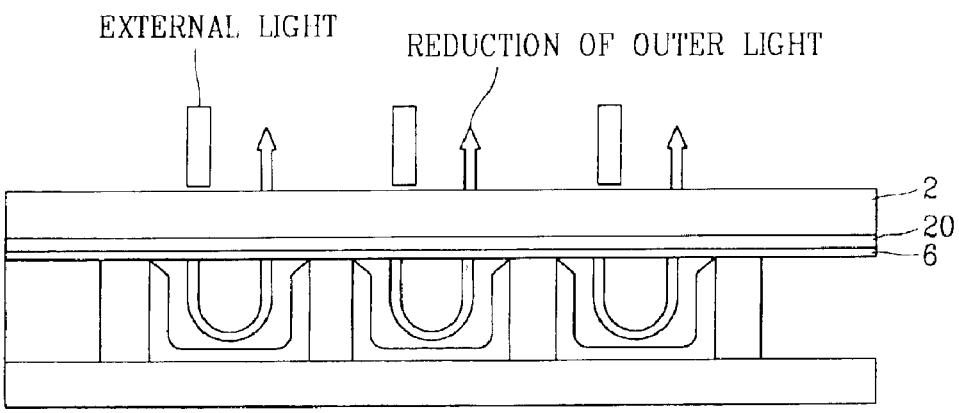
FIG. 6 is a pattern diagram showing a panel for reducing reflection of outer light according to the present invention.

FIG. 6 is a pattern diagram showing a panel for reducing reflection of outer light according to the present invention.

As shown therein, the outer light induced into the plasma display panel is filtered as passing through the upper dielectric layer 20, and the filtered visible light is reflected after reduction, and the contrast can be improved.

As described above, the present invention forms the upper dielectric layer by mixing the filler of oxide powder with the glass of $P_2O_5$—$B_2O_3$—ZnO group, and thereby improving the contrast of the plasma display panel easily without forming the color filter.

Also, the color filter is not used in the present invention, and thereby the fabrication processes for the plasma display panel become simple, and the fabrication cost can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A dielectric composition for a dielectric layer in a plasma display panel, wherein the plasma display panel includes an upper glass substrate, a sustain electrode on the upper glass substrate, a bus electrode on the sustain electrode, a lower glass substrate, a lower dielectric layer and an address electrode on the lower glass substrate, a fluorescent layer on the lower dielectric layer and on the address electrode, and a barrier rib on the lower dielectric layer, the dielectric composition comprising:

a glass of $P_2O_5$—$B_2O_3$—ZnO group; and a filler comprising $Nd_2O_3$.

2. The dielectric composition of claim 1, wherein the glass of $P_2O_5$—$B_2O_3$—ZnO group comprises $P_2O_5$ of approximately 28~40 weight %, $B_2O_3$ of approximately 0~30 weight %, and ZnO of approximately 42~60 weight %.

3. The dielectric composition of claim 1, wherein the filler comprises $Nd_2O_3$ of approximately 5~40 weight %.

4. The dielectric composition of claim 1, further comprising $Pr_2O_3$.

5. The dielectric composition of claim 4, wherein the filler comprises $Pr_2O_3$ of approximately 0~5 weight %.

6. The dielectric composition of claim 1, wherein the filler comprises $Pr_2O_3$ of approximately 0~5 weight %.

7. A method for fabricating a dielectric layer in a plasma display panel comprising the steps of:

fabricating a glass by mixing $Nd_2O_3$ with a glass of $P_2O_5$—$B_2O_3$—ZnO group as a predetermined weight %;

making the fabricated glass into powder by grinding, and forming a dielectric paste by mixing the powder with a binder, and with a solvent;

applying the paste on a glass substrate; and baking the applied dielectric paste to form the dielectric layer.

8. The method of claim 7, wherein the glass of $P_2O_5$—$B_2O_3$—ZnO group comprises $P_2O_5$ of approximately 28~40 weight %, $B_2O_3$ of approximately 0~30 weight %, and ZnO of approximately 42~60 weight %.

9. The method of claim 7, wherein the predetermined weight % of the $Nd_2O_3$ is approximately 5~40 weight %.

10. The method of claim 7, wherein the dielectric paste is baked at temperature of approximately 550~600° C. for approximately 10~30 minutes.

11. The method of claim 7, wherein the glass of $P_2O_5$—$B_2O_3$—ZnO group further comprises $Pr_2O_3$ of approximately 0~5 weight %.

12. The method of claim 7, wherein the solvent is α-terpineol or butyl-carbitol-acetate.

* * * * *